(12) United States Patent
Giblin et al.

(10) Patent No.: US 9,881,311 B2
(45) Date of Patent: Jan. 30, 2018

(54) DETERMINING A LOWEST PRICE FOR A DYNAMICALLY PRICED PRODUCT

(71) Applicant: International Business Machines Corporation, Armonk, NY (US)

(72) Inventors: Christopher J. Giblin, Zurich (CH); John Rooney, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 768 days.

(21) Appl. No.: 14/265,802

(22) Filed: Apr. 30, 2014

(65) Prior Publication Data
US 2015/0317658 A1 Nov. 5, 2015

(51) Int. Cl.
*G06Q 10/00* (2012.01)
*G06Q 30/00* (2012.01)
(Continued)

(52) U.S. Cl.
CPC ... *G06Q 30/0206* (2013.01); *G06F 17/30864* (2013.01); *G06Q 30/02* (2013.01); *G06Q 30/0269* (2013.01)

(58) Field of Classification Search
CPC . G06Q 30/0206; G06Q 30/0269; G06Q 30/02
(Continued)

(56) References Cited

U.S. PATENT DOCUMENTS

| 8,996,312 B1* | 3/2015 | Freund | G01C 21/3461 |
| | | | 455/457 |
| 2005/0086087 A1* | 4/2005 | Razza | G06Q 10/025 |
| | | | 705/5 |

(Continued)

FOREIGN PATENT DOCUMENTS

WO 2013052081 A2 4/2013

OTHER PUBLICATIONS

Kayak.com Becomes First Travel Search Engine to Launch Air Fare 'Flexible Search' Functionality; Leading Travel Site Also Debuts Revamped Traveler Profiles and Enhancements to Kayak Buzz. PR Newswire; New York [New York] May 30, 2006: n/a. 4 pgs.*

(Continued)

*Primary Examiner* — Timothy Padot
(74) *Attorney, Agent, or Firm* — Cantor Colburn LLP; Daniel Morris (57) ABSTRACT

In one embodiment, a computer-implemented method includes receiving a request for a product. Two or more fingerprints are selected, where each fingerprint includes digital data describing a corresponding virtual customer. By a computer processor, a first fingerprint is loaded to emulate a first virtual customer. A first price query is submitted to a vendor's web service for the product, where the first price query uses the loaded first fingerprint. A second fingerprint is loaded to emulate a second virtual customer. A second price query is submitted to the vendor's web service for the product, where the second price query uses the loaded second fingerprint. Two or more prices are received from the vendor's web service, including a first price received in response to the first price query and a second price received in response to the second price query. A lowest price is selected from among the prices received.

20 Claims, 3 Drawing Sheets

(51) Int. Cl.
*G06Q 30/02* (2012.01)
*G06F 17/30* (2006.01)

(58) Field of Classification Search
USPC .......................................... 705/7.35
See application file for complete search history.

(56) References Cited

U.S. PATENT DOCUMENTS

| | | | |
|---|---|---|---|
| 2007/0050201 A1* | 3/2007 | Gardner | G06Q 30/0282 |
| | | | 705/1.1 |
| 2009/0171899 A1* | 7/2009 | Chittoor | G06Q 10/02 |
| 2011/0040656 A1* | 2/2011 | Groetzinger | G06Q 30/0278 |
| | | | 705/27.1 |
| 2011/0307319 A1* | 12/2011 | Balestrieri | G06Q 30/02 |
| | | | 705/14.39 |
| 2013/0246213 A1 | 9/2013 | Lee et al. | |
| 2014/0067513 A1* | 3/2014 | Arora | G06Q 30/02 |
| | | | 705/14.35 |

OTHER PUBLICATIONS

InfoSpace Drives Mobile Commerce Adoption by Offering Dynamic Pricing Services to Millions of Merchants. PR Newswire Aug. 17, 2000: NA. 4 pgs.*

Jakub Mikians et al. Detecting price and search discrimination on the internet. Proceedings of the 11th ACM Workshop on Hot Topics in Networks, p. 79-84, Oct. 29-30, 2012, Redmond, Washington. 6 pgs.*

* cited by examiner

DETERMINING A LOWEST PRICE FOR A DYNAMICALLY PRICED PRODUCT

BACKGROUND

Various embodiments of this disclosure relate to dynamic pricing and, more particularly, to determining a lowest price of a product that is dynamically priced by an online vendor.

Online vendors have great flexibility in their charging models because they are not restricted to a fixed price display for their products. Rather, the website of the vendor can dynamically modify the price. Some vendors dynamically alter prices by estimating the maximum amount each customer is willing to pay and attempting to offer to each customer his or her highest acceptable price.

A typical example of this occurs in the pricing of airline tickets. It is generally agreed that business passengers are willing to pay more, since their travel is required for their work. Business customers tend to travel during the business week. Thus, ticket vendors often charge less for flights that involve a weekend, thus offering lower prices to those who are likely traveling for leisure and therefore might be less likely to fly if prices are too high. Some airline ticket vendors additionally sell customers the privilege of been seated together in a group. In that case, the ticket vendor may select seat assignments for a set of tickets, where the seat assignments are based on a default seating algorithm. The ticket vendor may then offer to group the seat assignments together for an additional cost. This additional cost may be based on the estimated price sensitivity of the customer.

As online vendors become more sophisticated, they are examining more than just the for-sale product itself when determining prices. For instance, a vendor might consider various factors, such as: customer behaviors in an online store, quantity of times the customer entered and left the store, the customer's geographic location, characteristics about the customer's computer, or other factors. In one reported case, owners of a first type of computer were charged more for the same good as compared to owners of a second type of computer. This is because retailers believed that owners of the first type of computer were price insensitive. Practices such as this are legal for online vendors in the United States and, for customers, may be difficult to identify and act upon.

SUMMARY

In one embodiment of this disclosure, a computer-implemented method includes receiving a request from a user for a product. Two or more fingerprints are selected representing two or more virtual customers. A first fingerprint of the two or more fingerprints includes digital data describing a first virtual customer; a second fingerprint of the two or more fingerprints includes digital data describing a second virtual customer; and the first fingerprint is distinct from the second fingerprint. By a computer processor, the first fingerprint is loaded to emulate the first virtual customer. A first price query is submitted to a vendor's web service for a price of the product, where the first price query uses the loaded first fingerprint. The second fingerprint is loaded to emulate the second virtual customer. A second price query is submitted to the vendor's web service for a price of the product, where the second price query uses the loaded second fingerprint. Two or more prices of the product are received from the vendor's web service, including a first price received in response to the first price query and a second price received in response to the second price query. A lowest price is selected from among the prices received for the product from the vendor's web service. The lowest price is reported to the user in response to the request from the user.

In another embodiment, a system includes a pricing service and a fingerprint generator. The pricing service is configured to receive a request from a user for a product and select two or more fingerprints representing two or more virtual customers. A first fingerprint of the two or more fingerprints includes digital data describing a first virtual customer; a second fingerprint of the two or more fingerprints includes digital data describing a second virtual customer; and the first fingerprint is distinct from the second fingerprint. The fingerprint generator is configured to load, by a computer processor, the first fingerprint to emulate the first virtual customer. The pricing service is further configured to submit a first price query to a vendor's web service for a price of the product, where the first price query uses the loaded first fingerprint. The fingerprint generator is further configured to load the second fingerprint to emulate the second virtual customer. The pricing service is further configured to submit a second price query to the vendor's web service for a price of the product, where the second price query uses the loaded second fingerprint; and to receive from the vendor's web service two or more prices of the product. The two or more prices include a first price received in response to the first price query and a second price received in response to the second price query. The pricing service is further configured to select a lowest price from among the prices received for the product from the vendor's web service, and to report the lowest price to the user in response to the request from the user.

In yet another embodiment, a computer program product for determining a lowest price of a product includes a computer readable storage medium having program instructions embodied therewith. The program instructions are executable by a processor to cause the processor to perform a method. The method includes receiving a request from a user for a product. Two or more fingerprints are selected representing two or more virtual customers. A first fingerprint of the two or more fingerprints includes digital data describing a first virtual customer; a second fingerprint of the two or more fingerprints includes digital data describing a second virtual customer; and the first fingerprint is distinct from the second fingerprint. Further according to the method, the first fingerprint is loaded to emulate the first virtual customer. A first price query is submitted to a vendor's web service for a price of the product, where the first price query uses the loaded first fingerprint. The second fingerprint is loaded to emulate the second virtual customer. A second price query is submitted to the vendor's web service for a price of the product, where the second price query uses the loaded second fingerprint. Two or more prices of the product are received from the vendor's web service, including a first price received in response to the first price query and a second price received in response to the second price query. A lowest price is selected from among the prices received for the product from the vendor's web service. The lowest price is reported to the user in response to the request from the user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Pricing systems according to some embodiments of this disclosure may identify a lowest price available for a product, such as a good or service, and may purchase the product for a user on behalf of the user. It will be understood that the term "lowest price," as used herein, refers not to the lowest possible price, but rather to the lowest price discoverable by the pricing system.

Figure 1:
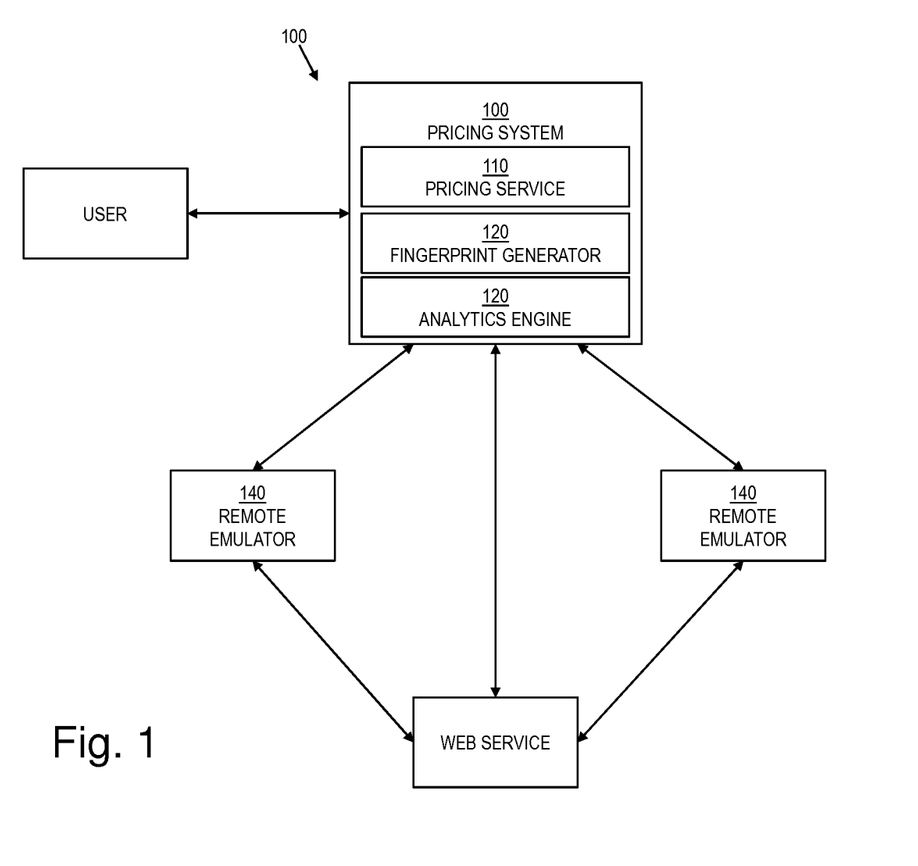
FIG. 1 is a block diagram of a pricing system, according to some embodiments of this disclosure.

FIG. 1 is a block diagram of a pricing system 100, according to some embodiments of this disclosure. The pricing system 100 may attempt to minimize a user's price to purchase a product the user desires. More specifically, the pricing system 100 may obtain two or more prices for the product, and may inform the user of the lowest of such prices. In some embodiments, the pricing system 100 may also automatically purchase the product at the lowest price on the user's behalf.

In the context of this disclosure, customers can be classified as price sensitive or price insensitive, where the two terms are relative. For instance, a first customer may be more or less price sensitive than another customer. "Price sensitivity" refers to how much a price change affects a customer's willingness to buy a product in question. Thus, a price increase may cause a price-sensitive person not to purchase the product, while the increase may not affect a price-insensitive customer's willingness to purchase the product As shown in FIG. 1, the pricing system 100 may include a pricing service 110, a fingerprint generator 120, and an analytics engine 130, each of which may include hardware, software, or a combination of both. It will be understood that, although the pricing service 110, the fingerprint generator 120, and the analytics engine 130 are depicted in FIG. 1 as being distinct components, this need not be the case. Rather, these components may share hardware or software, or may be further divided based on implementation details. Generally, the pricing service 110 may provide an interface for a user to request pricing of a product, and may provide such pricing to the user and make purchases on the user's behalf; the fingerprint generator may generate one or more fingerprints representing virtual customers, so as to determining potential pricing for those virtual customers; and the analytics engine may analyze the pricing data received from vendors' websites. In some embodiments, the pricing system 100 may additionally include one or more remote emulators 140.

The pricing system 100 may provide a user with pricing for a product, such as a good or a service, specified by the user. In some embodiments, the pricing system 100 may also purchase the product on the user's behalf. To use the pricing system 100, the user may communicate a pricing request to the pricing system in the form of request data. More particularly, in some embodiments, the user may access the pricing system 100 by communicating the request data to the pricing service 110.

The request data may include information about a product the user desires to purchase, and may further include guidelines for purchase of that product. For example, and not by way of limitation, the request data may include one or more of the following: identification of the product, one or more vendor websites from which the product is purchasable, desired price range for purchasing the product, one or more criteria for the product (e.g., color, size, seat assignment); and timeframe during which the purchase should be made or results should be returned. In some embodiments, identification of the product may be provided in the form of a direct link to a web page for purchasing the product, but it will be understood that other forms of identification may also be used.

The pricing system 100 may obtain one or more prices for the product and may select the lowest of such prices that meet the user's criteria as specified in the request data. To obtain one or more prices, the pricing system 100 may submit one or more price requests for the product to at least one online vendor. In some embodiments, such price requests may be submitted to the vendor through use of a web service, which may be accessible through a website, operated by or associated with the vendor. Each price request may use a distinct customer fingerprint. A fingerprint may capture various information about a customer or a virtual customer, as will be described further below.

Today, vendor web services can access information about a user or the user's computing device when the user visits the vendor's website. This user information can include, for example: brand of computer; brand of web browser; preferred language (e.g., English, Spanish); IP address; geographical location, which may be apparent based on the user's IP address; activity on the vendor's website; frequency of visiting the vendor's website; and other websites visited, which may be apparent through cookies stored on the user's computing device. This discoverable user information represents the user, and is referred to herein collectively as the user's fingerprint. In some embodiments, a fingerprint may also include global variables, such as the current date, the day of the week, or time of day, as these may also factor into a vendor's pricing.

The pricing system 100 may select and generate one or more fingerprints for pricing a product in response to a user's request for such product. In some embodiments, fingerprint generation may be performed by the fingerprint generator 120. The fingerprint selection and generation may be directed toward identifying a fingerprint that represents a virtual customer the vendor deems to be most price sensitive, and therefore results in a lowest price of the product.

Presumably, an online vendor will use a pricing algorithm to determine the price of a product. The complexity of such algorithms may vary between vendors, and may be as simple as a fixed price or may use various information in the user fingerprint to dynamically determine a price. Thus, when a customer having a first fingerprint requests a price, the resulting price may differ from that received when a second customer having a second fingerprint requests a price. The pricing system 100 may therefore receive multiple prices for a single product by creating virtual customers through the use of generated fingerprints.

The pricing system 100, such as by way of the fingerprint generator 120, may generate, or load, one or more fingerprints. Each fingerprint may represent a virtual customer. As each of such virtual customers, the pricing system 100 may request a price of the product from the vendor. In other words, the pricing system 100 may ensure that the vendor sees a particular, generated fingerprint when the price request is made. Various mechanisms may be used to generate a selected fingerprint so that the desired, selected fingerprint is seen by the vendor when such request is made.

The pricing service 110 may be configured to emulate various aspects of a fingerprint, such as, for example, the computer brand or browser brand and version. To this end, for example, the pricing system 100 may take advantage of one or more cloud providers that offer virtual machines, may include in its own infrastructure various hardware and software for generating fingerprints, or may utilize some hybrid of these two techniques. For instance, the pricing system 100 may incorporate various hardware and software, such that the desired hardware or software for a fingerprint may actually be used in querying the vendor for pricing.

Other aspects of a fingerprint may require other methods of virtualization. For example, to utilize a different geographical location than the one in which aspects of the pricing system 100 reside, the pricing system 100 may use one or more relays, to route the web service requests through the desired geographical location. In some embodiments, a remote emulator 140 in a desired geographical location for a fingerprint may be used to query the vendor, thus resulting in a fingerprint having the geographical location of the remote emulator 140.

For another example, to generate a selected fingerprint having certain activity on the vendor's website (e.g., having remained on the website for a certain time period, or having visited the website with certain frequency), the pricing system 100 may connect to the vendor's website and perform the various activities associated with the selected fingerprint in order to generate that fingerprint.

Some of the above mechanisms for generating a selected fingerprint may require time to occur. Thus, when a user requests pricing from the pricing service 100, the user may specify in the request data a timeframe for receiving results. For instance, if a selected fingerprint to be generated has been on the vendor's website for an hour, then the pricing system 100 may spend an hour on the vendor's website before being able to obtain pricing for that fingerprint. For another example, it may not be possible to generate a fingerprint in which a current day of the week is Thursday until the next Thursday comes around on the calendar. Thus, days may need to pass before a fingerprint representing that the current day is Thursday may be generated. In some embodiments, given the time-dependence of some fingerprint variables, the pricing system 100 may use only fingerprints that may be generated within a timeframe specified by the user, or within a default timeframe, when determining a lowest price for the product sought.

As mentioned above, the pricing system 100 may generate, or load, one or more selected fingerprints for the user's pricing request. To this end, the pricing system 100 may select which possible fingerprints to generate and use. A fingerprint may be multi-dimensional and may include one or more variables, where each variable is a piece of information about an associated virtual customer. For instance, the computer brand of the virtual customer may be a variable within the corresponding fingerprint. In some embodiments, information in a fingerprint may be represented by only Boolean variables. In that case, for example, one variable may represent whether the virtual customer's computer is an IBM which may be represented by a 1 if the computer is an IBM, and by a 0 if the computer is not.

Regardless of the data types used for the variables, however, the quantity of possible fingerprints is based on the number of variables in the fingerprint and the number of values possible for each of such variables. In some embodiments, the pricing system 100 may use a brute force method of selecting which of the possible fingerprints to generate by simply generating all possible fingerprints (i.e., all combinations of the variables that make up a fingerprint), or by generating a sample subset of possible fingerprints. When a sample subset is used, the selected fingerprints to be generated may be selected randomly, or through some other sampling mechanism. When one or more of the variables, such as time on the site, have many or infinite possible values, the pricing system 100 may select a reasonable sample of such values. For example, the pricing system 100 may select timeframes in intervals of five minutes in the range from zero seconds up to the maximum timeframe allowed to return pricing information to the requesting user.

In some embodiments, the pricing system 100 may request pricing from the online vendor for each of the selected and generated fingerprints. After a fingerprint has been generated, and is loaded as the current fingerprint of the pricing service 110, the online vendor sees the corresponding virtual customer, and therefore returns a price based on that virtual customer's presumed price sensitivity. Thus, generating multiple signatures may lead to receiving multiple prices from the online vendor. From the prices received based on the fingerprints, the pricing system 100, such as through the analytics engine 130, may determine that the lowest price is the lowest price received in response to the pricing requests based on the various generated fingerprints.

In some other embodiments, however, the pricing system 100 may make more intelligent decisions when selecting which fingerprints to generate, based on analyzing prices of the product for a sample of the possible fingerprints. In other words, the pricing system 100 may create a hypothesis, or model, about how the vendor's website identifies price sensitivity. The pricing system 100 may then test and refine this hypothesis by repeatedly changing the fingerprint being used and then testing how the pricing changes based on the fingerprint change. This process of refining the hypothesis by repeatedly modifying the fingerprint may continue until a valid hypothesis is identified, which may be confirmed by a vendor providing pricing that is in line with the current hypothesis. From that valid hypothesis, the pricing system 100 may then select a fingerprint (i.e., by selecting values for the variables within the fingerprint) meant to represent a maximally price-sensitive customer. The pricing system 100 may request pricing from the vendor's website, using this fingerprint, which may result in a lowest price for the product. In some embodiments, this analysis may be performed by the analytics engine 130.

In some cases, the hypothesis may be simple, e.g., "users of a certain operating system are charged more for the product in question." In practice however, different products tend to lead to different pricing schemes, and indications of price sensitivity with respect to one product may be different from indications of price sensitivity with respect to a different product. Further, even vendors selling the same product may have different algorithms for determining price sensitivity and resulting price. The issue is further compounded by the fact that some products are scarce, e.g., airline tickets, while others are not, e.g., books. The price of scarce products can be expected to vary over time as the products are sold. Thus, the determination of what variables within a fingerprint are most indicative of price sensitivity according to a vendor may end up being a complex determination.

In some embodiments, the pricing system 100 may perform a factor analysis, or other analysis mechanism known in the art, to model the pricing of the product in question. If the pricing system 100 uses Boolean variables, as discussed above, then a maximum of $2^n$ fingerprints are possible, where n represents the total number of variables in each fingerprint. The pricing system may perform a $2^n$ factor analysis to account for the importance of each factor, where each variable of the fingerprint structure is represented as a factor in the analysis.

Likely, some of the $2^n$ fingerprints may be nonsensical due to contradictions. For instance, a fingerprint that indicates that the virtual customer's computer is both an Apple computer (via a first variable) and an IBM computer (via a second variable) contradicts itself inherently. In some embodiments, the pricing system 100 may be aware of which variables have the potential to contradict one another and may avoid attempting to generate fingerprints that are inherently contradictory.

Using factor analysis, or another known technique, the pricing system 100 may model a vendor's pricing of a product as follows: price=$q_0+q_a x_a+q_b x_b+q_{ab} x_{ab}$. In this model, $q_0$ is the average price; $q_a$ is the part of the price due to a first Boolean variable; $q_b$ is the part of the price due to a second Boolean variable; and $q_{ab}$ is the part of the price due to the first and second Boolean variables combined. One skilled in the art will understand that this model is extendable to more than two variables. Using factor analysis, the pricing system 100 may solve for $x_a$, $x_b$, and $x_{ab}$. The pricing system 100 may then dynamically identify a fingerprint representing a price-insensitive customer, based on the vendor's actual pricing.

In some embodiments, the pricing system 100 may query more than a single vendor's website for pricing of the product desired by the user. In that case, a lowest price may be identified at each website, and the overall lowest price may be returned to the uses.

After a lowest price is identified for the product, the pricing system 100 may simply return that price to the user for the user's reference. In some embodiments, however, the user may provide the pricing system 100 with payment information, and the pricing system 100 may purchase the product for the lowest price on the user's behalf. This payment information may be provided at various times, for example, upon making the initial request for pricing, or after receiving information about the lowest price identified by the pricing system 100. In some embodiments, when providing payment before seeing the lowest price, the user may specify the maximum he or she is willing to pay, in which case the pricing system 100 may purchase the product at the lowest identified price unless that price exceeds the user's specified maximum.

Figure 2:
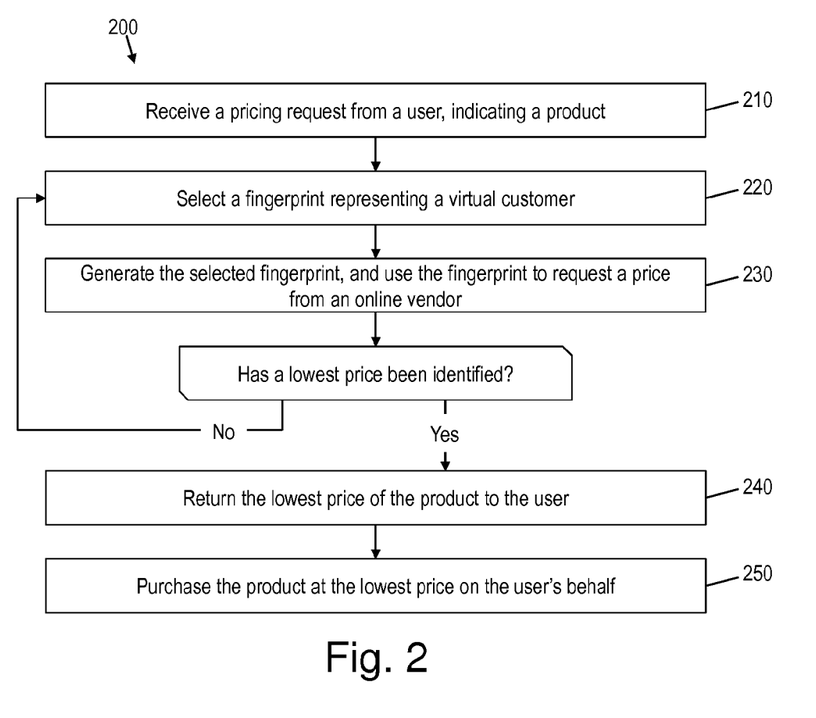
FIG. 2 is a flow diagram of a method for determining a lowest price for a product, according to some embodiments of this disclosure.

FIG. 2 is a flow diagram of a method 200 for determining a lowest price for a product, according to some embodiments of this disclosure. As shown, at block 210, the pricing system 100 may receive request data from a user, where the request data indicates at least a product for which a lowest price is sought. At block 220, the pricing system 100 may select a fingerprint representing a virtual customer. At block 230, the pricing system 100 may generate the selected fingerprint and, using that fingerprint, request a price of the product from an online vendor. Blocks 220 and 230 may be repeated until a lowest price is identified. In some embodiments, blocks 220 and 230 may be repeated at least until the pricing system 100 develops a pricing model, at which time the pricing system can select and generate a fingerprint representing a price-sensitive virtual customer for obtaining the lowest price. In some other embodiments, the lowest price may be identified by simply selecting the lowest price from among a sample of possible fingerprints that are selected and generated. At block 240, after the lowest price is identified, the pricing system 100 may return the lowest price to the user in response to the request data. At block 250, the pricing system 100 may purchase the product on the user's behalf, using the fingerprint that resulted in the lowest price, thus obtaining the lowest price for the user. It will be understood that other methods for determining a lowest price are also within the scope of this disclosure.

Figure 3:
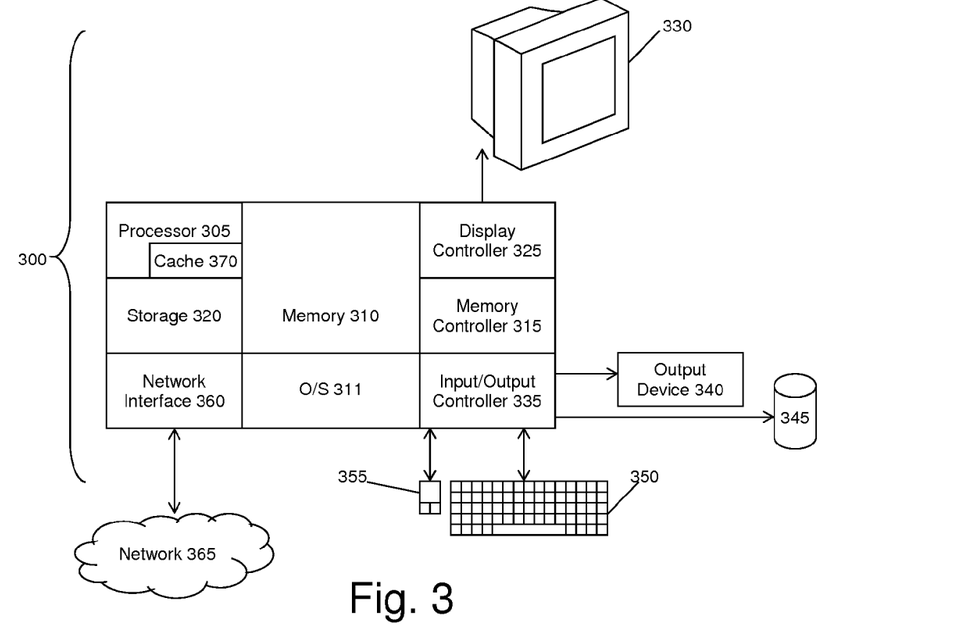
FIG. 3 is a block diagram of a computing device for implementing some or all aspects of the pricing system, according to some embodiments of this disclosure.

FIG. 3 illustrates a block diagram of a computer system 300 for use in implementing a pricing system 100 or method according to some embodiments. For instance, in some embodiments, some or all aspects of the pricing system 100 may be embodied in such a computer system 300, or one or more of the emulators 140 may be embodied in computer systems 130. The pricing systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 300, such as a personal computer, workstation, minicomputer, or mainframe computer.

In an exemplary embodiment, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. A conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be any custom made or commercially available processor, a central processing unit (CPU), an auxiliary processor among several processors associated with the computer system 300, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the pricing systems and methods of this disclosure.

The computer system 300 may further include a display controller 325 coupled to a display 330. In an exemplary embodiment, the computer system 300 may further include a network interface 360 for coupling to a network 365. The network 365 may be an IP-based network for communication between the computer system 300 and any external server, client and the like via a broadband connection. The network 365 transmits and receives data between the computer system 300 and external systems. In an exemplary embodiment, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Pricing systems and methods according to this disclosure may be embodied, in whole or in part, in computer program products or in computer systems 300, such as that illustrated in FIG. 3.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a pricing service comprising first hardware, a request for a product;
   generating, by a fingerprint generator comprising second hardware, a user fingerprint for a user that submitted the request, wherein the user fingerprint comprises digital data describing the user;
   selecting a first fingerprint of a first virtual customer distinct from the user, wherein the first fingerprint comprises digital data describing the first virtual customer, wherein the first fingerprint is distinct from the user fingerprint, and wherein the first fingerprint incorporates an indication of a first operating system distinct from a user operating system from which the request was received;
   loading, by a computer processor, the first fingerprint to emulate the first virtual customer;
   submitting a first price query to a vendor's web service for a price of the product, wherein the first price query is responsive to the request from the user and uses the loaded first fingerprint describing the first virtual customer distinct from the user;
   wherein the loading the first fingerprint comprises executing the submitting by way of applicable hardware on which the first operating system is installed;
   loading the user fingerprint to represent the user;
   submitting a second price query to the vendor's web service for a price of the product, wherein the second price query is responsive to the request from the user and uses the loaded user fingerprint;
   receiving from the vendor's web service two or more prices of the product, comprising a first price corresponding to the first price query and a second price corresponding to the second price query;
   determining, by an analytics engine comprising third hardware, that the first price received in response to the first query is a lowest price from among the two or more prices received for the product from the vendor's web service; and
   reporting to the user the first price, corresponding to the first virtual customer distinct from the user, as the lowest price responsive to the request of the user.

2. The method of claim 1, further comprising:
   developing a hypothesis describing how the vendor's web service identifies price sensitive customers; and refining the hypothesis by:
   selecting a new fingerprint representing a new virtual customer;
   loading the new fingerprint to emulate the new virtual customer;
   submitting a new price query to the vendor's web service for a price of the product, wherein the new price query uses the loaded new fingerprint;
   repeating the selecting the new fingerprint, loading the new fingerprint, and submitting the new price query until the hypothesis is validated; and
wherein a plurality of new price queries are submitted to the vendor's web service for prices of the product, using a plurality of new fingerprints.

3. The method of claim 1, further comprising performing a factor analysis, based at least in part on the two or more prices of the product and on the first fingerprint and the user fingerprint, to determine a pricing model of the vendor's web service.

4. The method of claim 1, wherein the first fingerprint is a multi-dimensional variable describing the first virtual customer with respect to at least one of brand of computer, brand of web browser, IP address, geographical location, activity on the vendor's website, frequency of visiting the vendor's website, and other websites visited.

5. The method of claim 1, wherein loading the first fingerprint comprises selecting a set of hardware and software to use when submitting the first price query to the vendor's web service.

6. The method of claim 1, wherein the first fingerprint comprises digital data describing activity on the vendor's website, and wherein loading the first fingerprint comprises performing the described activity on the vendor's website prior to submitting the first price query.

7. The method of claim 1, further comprising automatically purchasing the product on the user's behalf at the lowest price from among the prices received for the product.

8. A system comprising:
a memory having computer-readable instructions; and
one or more processors for executing the computer-readable instructions, the computer-readable instructions comprising:
   receiving, by a pricing service comprising first hardware, a request for a product; and
   generating, by a fingerprint generator comprising second hardware, a user fingerprint for a user that submitted the request, wherein the user fingerprint comprises digital data describing the user;
   selecting a first fingerprint of a first virtual customer distinct from the user, wherein the first fingerprint comprises digital data describing the first virtual customer, wherein the first fingerprint is distinct from the user fingerprint, and wherein the first fingerprint incorporates an indication of a first operating system distinct from a user operating system from which the request was received;
   loading the first fingerprint to emulate the first virtual customer;
   submitting a first price query to a vendor's web service for a price of the product, wherein the first price query is responsive to the request from the user and uses the loaded first fingerprint describing the first virtual customer distinct from the user;
   wherein the loading the first fingerprint comprises executing the submitting by way of applicable hardware on which the first operating system is installed;
   loading the user fingerprint to represent the user; and
   submitting a second price query to the vendor's web service for a price of the product, wherein the second price query is responsive to the request from the user and uses the loaded user fingerprint;
   receiving from the vendor's web service two or more prices of the product, comprising a first price corresponding to the first price query and a second price corresponding to the second price query;
   determining, by an analytics engine comprising third hardware, that the first price received in response to the first query is a lowest price from among the two or more prices received for the product from the vendor's web service;
   reporting to the user the first price, corresponding to the first virtual customer distinct from the user, as the lowest price responsive to the request of the user; and
   purchasing the product at the first price while using the first fingerprint describing the first virtual customer distinct from the user.

9. The system of claim 8, the computer-readable instructions further comprising:
   developing a hypothesis describing how the vendor's web service identifies price sensitive customers; and
   refining the hypothesis by:
      selecting a new fingerprint representing a new virtual customer;
      loading the new fingerprint to emulate the new virtual customer;
      submitting a new price query to the vendor's web service for a price of the product, wherein the new price query uses the loaded new fingerprint; and
      repeating the selecting the new fingerprint, loading the new fingerprint, and submitting the new price query until the hypothesis is validated;
   wherein a plurality of new price queries are submitted to the vendor's web service for prices of the product, using a plurality of new fingerprints.

10. The system of claim 8, the computer-readable instructions further comprising performing a factor analysis, based at least in part on the two or more prices of the product and on the first fingerprint and the user fingerprint, to determine a pricing model of the vendor's web service.

11. The system of claim 8, wherein the first fingerprint is a multi-dimensional variable describing the first virtual customer with respect to at least one of brand of computer, brand of web browser, IP address, geographical location, activity on the vendor's website, frequency of visiting the vendor's website, and other websites visited.

12. The system of claim 8, wherein loading the first fingerprint comprises selecting a set of hardware and software to use when submitting the first price query to the vendor's web service.

13. The system of claim 8, wherein the first fingerprint comprises digital data describing activity on the vendor's website, and wherein loading the first fingerprint comprises performing the described activity on the vendor's website prior to submitting the first price query.

14. A computer program product for determining a lowest price of a product, the computer program product comprising a computer readable storage medium having program instructions embodied therewith, the program instructions executable by a processor to cause the processor to perform a method comprising:
   receiving, by a pricing service comprising first hardware, a request for a product;

generating, by a fingerprint generator comprising second hardware, a user fingerprint for a user that submitted the request, wherein the user fingerprint comprises digital data describing the user;

selecting a first fingerprint of a first virtual customer distinct from the user, wherein the first fingerprint comprises digital data describing the first virtual customer, wherein the first fingerprint is distinct from the user fingerprint, and wherein the first fingerprint incorporates an indication of a first operating system distinct from a user operating system from which the request was received;

loading the first fingerprint to emulate the first virtual customer;

submitting a first price query to a vendor's web service for a price of the product, wherein the first price query is responsive to the request from the user and uses the loaded first fingerprint describing the first virtual customer distinct from the user;

wherein the loading the first fingerprint comprises executing the submitting by way of applicable hardware on which the first operating system is installed;

loading the user fingerprint to represent the user;

submitting a second price query to the vendor's web service for a price of the product, wherein the second price query is responsive to the request from the user and uses the loaded user fingerprint;

receiving from the vendor's web service two or more prices of the product, comprising a first price corresponding to the first price query and a second price corresponding to the second price query;

determining, by an analytics engine comprising third hardware, that the first price received in response to the first query is a lowest price from among the two or more prices received for the product from the vendor's web service; and reporting to the user the first price, corresponding to the first virtual customer distinct from the user, as the lowest price responsive to the request of the user.

15. The computer program product of claim 14, the method further comprising:

developing a hypothesis describing how the vendor's web service identifies price sensitive customers; and refining the hypothesis by:
  selecting a new fingerprint representing a new virtual customer;
  loading the new fingerprint to emulate the new virtual customer;
  submitting a new price query to the vendor's web service for a price of the product, wherein the new price query uses the loaded new fingerprint;
  repeating the selecting the new fingerprint, loading the new fingerprint, and submitting the new price query until the hypothesis is validated; and
  wherein a plurality of new price queries are submitted to the vendor's web service for prices of the product, using a plurality of new fingerprints.

16. The computer program product of claim 14, the method further comprising performing a factor analysis, based at least in part on the two or more prices of the product and on the first fingerprint and the user fingerprint, to determine a pricing model of the vendor's web service.

17. The computer program product of claim 14, wherein the first fingerprint is a multi-dimensional variable describing the first virtual customer with respect to at least one of brand of computer, brand of web browser, IP address, geographical location, activity on the vendor's website, frequency of visiting the vendor's website, and other websites visited.

18. The computer program product of claim 14, wherein loading the first fingerprint comprises selecting a set of hardware and software to use when submitting the first price query to the vendor's web service.

19. The computer program product of claim 14, wherein the first fingerprint comprises digital data describing activity on the vendor's website, and wherein loading the first fingerprint comprises performing the described activity on the vendor's website prior to submitting the first price query.

20. The computer program product of claim 14, the method further comprising automatically purchasing the product on the user's behalf at the lowest price from among the prices received for the product.

* * * * *